E. F. ULRICH.
PISTON RING TESTING MACHINE.
APPLICATION FILED FEB. 18, 1920.
1,419,428.
Patented June 13, 1922.
2 SHEETS—SHEET 2.
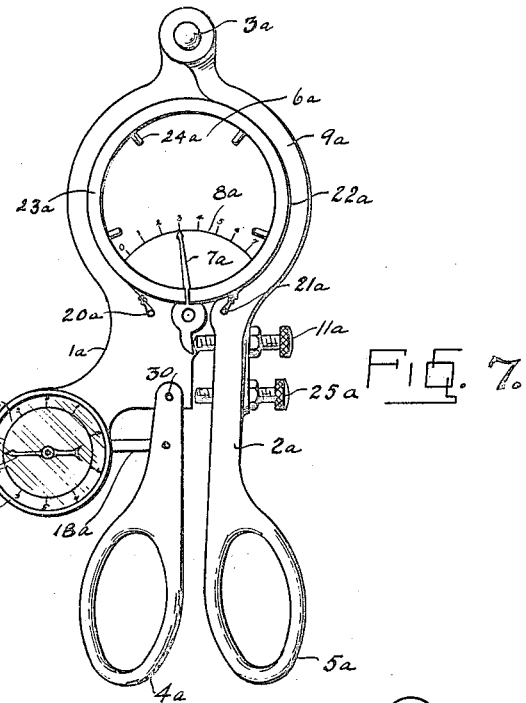
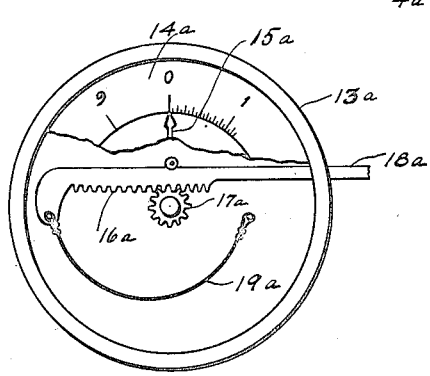
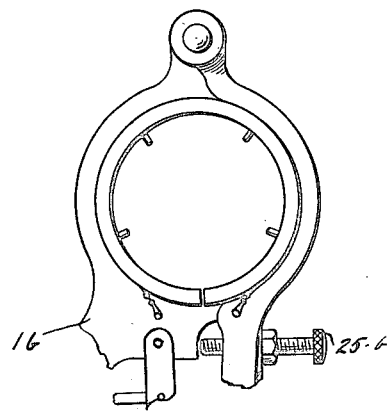

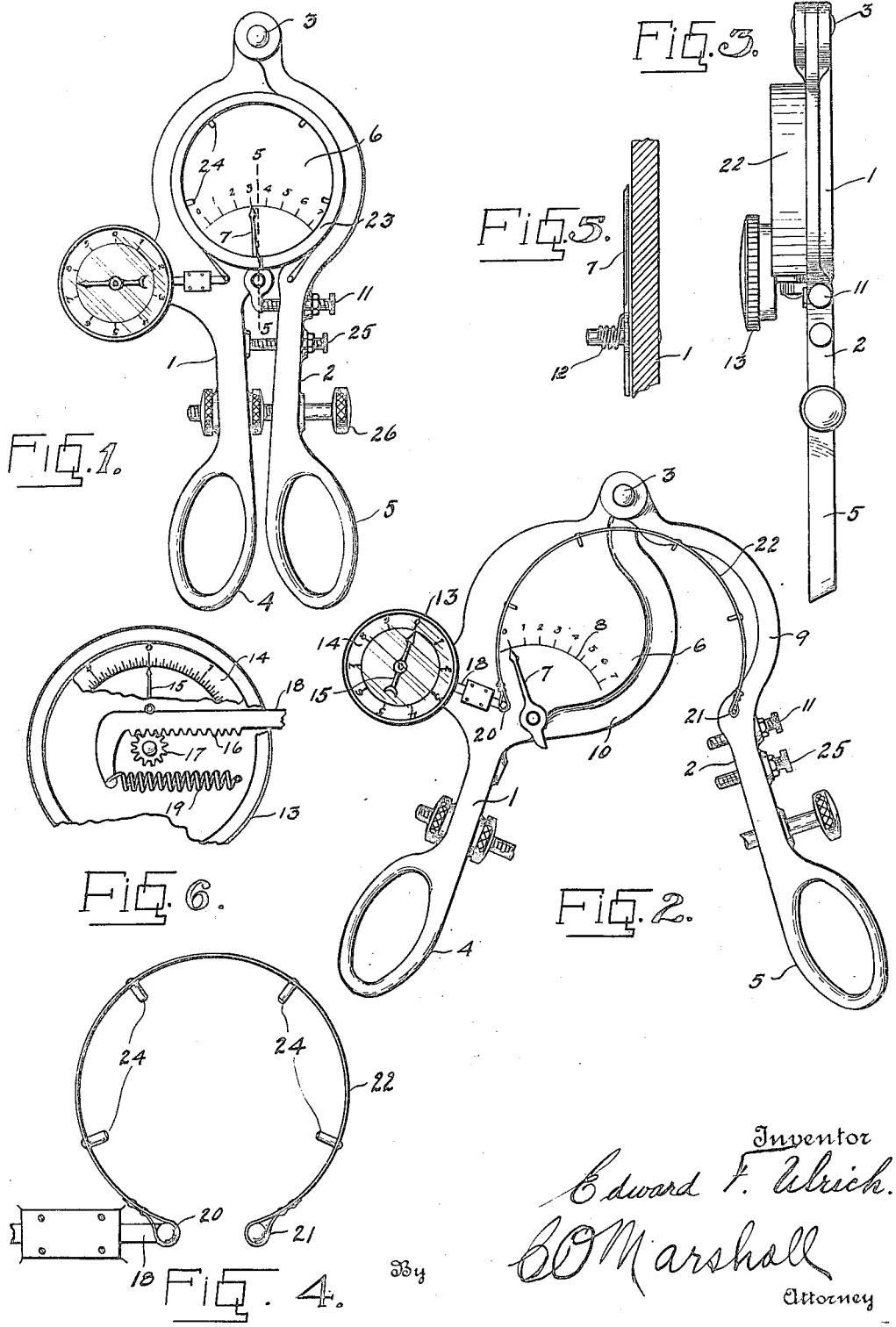

UNITED STATES PATENT OFFICE.

EDWARD F. ULRICH, OF TOLEDO, OHIO, ASSIGNOR TO TOLEDO SCALE COMPANY, OF TOLEDO, OHIO, A CORPORATION OF NEW JERSEY.

PISTON-RING-TESTING MACHINE.

1,419,428.      Specification of Letters Patent.    Patented June 13, 1922.

Application filed February 18, 1920. Serial No. 359,658.

*To all whom it may concern:*

Be it known that I, EDWARD F. ULRICH, a citizen of the United States, residing at Toledo, in the county of Lucas and State of Ohio, have invented certain new and useful Improvements in Piston-Ring Testing Machines, of which the following is a specification.

This invention relates to testing machines for piston rings, and particularly to devices for measuring the expansibility or the expansive force exerted by them when compressed to predetermined dimensions corresponding, for example, to those of the cylinder in which the rings are intended to be employed. In airplane and automobile motors it is necessary for gas tightness and proper lubrication that all the piston rings used in the same cylinder engage the cylinder walls with approximately the same expansive force, and it is desirable for proper balance of the engine that the frictional resistance in each cylinder be the same and that the force with which the rings press against the cylinder walls be not so great as to cause excessive friction or prevent proper lubrication, but at the same time great enough to prevent leakage.

The principal object of this invention is the provision of a simple and comparatively inexpensive device by means of which rings may be expeditiously tested.

Another object is the provision of a device adapted for use in testing rings of any size.

Still another object is the provision of a device in which the expansibility of the ring is measured against the reaction of a spring.

Other objects and advantages will be apparent from the following description, in which reference is had to the accompanying drawings illustrating preferred embodiments of my invention and in which similar reference numerals designate similar parts throughout the several views.

In the drawings:—

Figure 1 is a plan view of one form of the device showing a piston ring compressed therein;

Figure 2 is a plan view thereof with the handles spread to better show the construction;

Figure 3 is an edge view taken from the right of Figure 1;

Figure 4 is a plan of a removable ring-receiving band forming an element of my invention;

Figure 5 is an enlarged fragmentary sectional view taken substantially on the line 5—5 of Figure 1;

Figure 6 is a fragmentary detail view of an indicator forming a part of one form of the instrument;

Figure 7 is a plan view of another form of the device;

Figure 8 is an enlarged detail of the pressure indicator, a part of the dial being broken away; and Figure 9 is a fragment of still another form of the device.

The testing machine in the illustrative embodiments shown is portable, but one of its sides may obviously be arranged to be secured to a bench or other structure so that the device is supported in a flat, upright or other convenient position.

Referring particularly to Figures 1 to 5, a pair of arms 1 and 2 are pivotally connected at their ends by means of a pintle 3 and provided with handles 4 and 5. The arm 1 near its pivoted end is expanded into a substantially plate-like portion 6, and a hand 7 is pivoted upon the arm 1 to swing over a suitably graduated arc 8 on the plate-like portion 6.

The arm 2 has an arcuate portion 9 adjacent its pivoted end which overlies a rabbet 10 in the plate-like portion 6 of the arm 1 when the arms are brought together. Adjacent its arcuate portion the arm 2 is provided with an abutment screw 11 adapted to engage the hand 7 and swing it over the arc 8 when the arms are brought together, a light spring 12 serving to return the arm to the position shown in Figure 2 when the arms are separated.

Attached to the arm 1 is an indicator 13 comprising a dial 14 and an indicating hand 15 suitably connected by means of a rack 16 and pinion 17 to a longitudinally-movable rod 18 which is adapted to be forced into the casing of the indicator 13 against the tension of a spring 19.

Pins 20 and 21 are fixed respectively to the rod 18 and arm 2, and over these pins are slipped the looped ends of a flexible metallic band 22. The band 22 is adapted to surround the piston ring 23, and may be furnished in several lengths so that piston rings to fit cylinders of any ordinary size may be tested by selecting an appropriate band.

In order that the ring may be supported out of contact with the arms 1 and 2 and the hand 7, and in order that friction may be reduced to a minimum, a series of inwardly-projecting pins 24 are fixed to the band 22 to position and support the ring. These pins may, if desired, be provided with anti-friction sleeves or rollers.

In order to facilitate bringing the arms 1 and 2, and consequently the hand 7, to a predetermined relative position, an abutment screw is threaded through the arm 2 and arranged to engage the arm 1, and in order to prevent undue spreading of the arms a screw 26 is passed loosely through an opening in the arm 2 and threaded into the arm 1.

When it is desired to test piston rings to fit, for example, a 3 in. cylinder, an appropriate band is slipped upon the pins 20 and 21, the abutment screw 11 is adjusted to bring the hand 7 to the 3 in. graduation, when a master ring of proper dimensions and stiffness is compressed by the band to a diameter of 3 ins., and the screw 25 is then turned into engagement with the arm 1. The expansive force exerted by the ring and indicated on the dial is noted. Each ring to be tested is then placed in the band and the arms are pressed toward each other until the screw 25 engages the arm 1 and the hand 7 stands at the 3 in. mark. Rings that are so stiff or so large that they would exert excessive pressure on the cylinder walls will not be compressed to the same extent as was the master ring and the rod 18 will be forced further into the indicator casing, thus causing the hand 15 to indicate a greater value on the dial 14. If the ring is too small or too flexible as compared with the master ring, it will be compressed further than the master ring and a lesser value will be indicated on the dial 14.

The form of device shown in Figures 7 and 8 comprises a pair of arms $1^a$ and $2^a$ pivoted together as at $3^a$ and provided with handles $4^a$ and $5^a$ adapted to be grasped by the operator. The arm $1^a$ is provided near its pivoted end with a plate-like portion $6^a$ and a pivoted hand $7^a$ moving over a graduated arc $8^a$. The arm $2^a$ is provided with an arcuate portion $9^a$ and an abutment screw $11^a$, these parts being similar in structure and function to the corresponding parts of the form first described. An indicator $13^a$ having a graduated dial $14^a$ and an indicating hand $15^a$ is mounted upon the arm $1^a$. The indicator hand is moved by means of a rack $16^a$ and pinion $17^a$, the rack being carried by a rod $18^a$ adapted to be drawn outwardly of the indicator $13^a$ against the tension of the spring $19^a$.

Pins $20^a$ and $21^a$ are fixed to the arms $1^a$ and $2^a$ and the looped ends of the flexible metallic band $22^a$ are slipped over these pins. The band $22^a$ is adapted to surround and compress a piston ring $23^a$, and in order that the ring may be supported out of engagement with the hand $7^a$, a series of inwardly-projecting pins $24^a$ is fixed to the band.

An abutment screw $25^a$ is threaded through the arm $2^a$ and may be adjusted to limit the movement of the arms toward each other. This form differs from the one previously described in that the arm $1^a$ is hinged, as at 30, the portion thereof carrying the pin $20^a$ being connected to the indicator, and the portion thereof carrying the handle being connected to the rod $18^a$.

In using this form of the device for testing 3 in. rings, for example, the proper band $22^a$ is slipped upon the pins $20^a$ and $21^a$ and the screw $11^a$ is adjusted so that when any ring placed in the device is compressed to a diameter of 3 ins. the hand $7^a$ will indicate the graduation numbered 3 on the arc $8^a$. The distortion of the spring $19^a$ and the movement of the hand $15^a$ are proportional to the amount of force required to bring the ring to this diameter, which is equal to the expansive force exerted by the ring when so compressed. In using this form of the device the ring is always compressed to the diameter of the cylinder in which it is intended to be used.

The device shown in Figure 9 differs from that shown in Figure 7 only in that the indicator hand $7^a$ and arc $8^a$ are omitted. The screw $25^b$ is adjusted to engage the arm $1^b$ when the ring is compressed to size. The indicator gage in this form must be read when the screw $25^b$ is lightly engaged with the arm $1^b$.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a device of the class described, in combination, means for engaging and compressing a piston ring, comprising a pair of members movable toward each other to compress such ring, and resilient means mounted upon one of said members adapted to be distorted by the expansive force of such ring.

2. In a device of the class described, in combination, a pair of relatively movable members, one of said members carrying an indicator, means carried by the other of said members for operating said indicator as said members are moved toward each other, means connected to said members to compress a piston ring as said members are moved toward each other, an index connected to one of said members, a spring connected to the said index, and means for flexing said spring according to the expansive force exerted by such piston ring.

3. In a device of the class described, in combination, a pair of relatively movable members, means operated by said members for compressing a piston ring, one of said members being jointed, a spring connected to the respective parts of said jointed member, and means for indicating the extent of distortion of said spring.

4. In a device of the class described, in combination, three relatively movable parts, means connected to two of said parts for compressing a piston ring, connections between one of said two parts and the third part, including a spring, and means for indicating the relative position of the spring-connected parts.

5. In a device of the class described, in combination, three relatively movable parts, means connected to two of said parts for compressing a piston ring, means for indicating the relative positions of said two parts, connections between one of said two parts and the third part, including a spring, and means for indicating the relative position of the spring-connected parts.

6. A device of the class described comprising, in combination, three parts hinged together, means connected to two of said parts for compressing a piston ring, connections between one of said two parts and the third part, including a spring, and means for indicating the relative position of the spring-connected parts.

7. A device of the class described comprising a pair of handles pivoted to each other, means for compressing a ring between said handles to any desired diameter, and means mounted on one of said handles for indicating the expansive force of said ring.

8. A device of the class described comprising a pair of handles pivoted to each other, means for compressing a ring between said handles to any desired diameter, and means mounted on one of said handles for measuring and indicating the expansive force of said ring.

EDWARD F. ULRICH.

Witnesses:
C. E. WILCOX,
C. O. MARSHALL.